United States Patent

[11] 3,623,141

| [72] | Inventor | John T. Boatwright<br>Hopkinton, N.H. |
|---|---|---|
| [21] | Appl. No. | 39,247 |
| [22] | Filed | May 21, 1970 |
| [45] | Patented | Nov. 23, 1971 |
| [73] | Assignee | Northeast Electronics Corporation<br>Concord, N.H. |

[54] APPARATUS AND METHOD FOR MEASURING TRANSMISSION CHANNEL CHARACTERISTICS
11 Claims, 3 Drawing Figs.

| [52] | U.S. Cl. | 324/57 DE,<br>324/57 FP |
|---|---|---|
| [51] | Int. Cl. | G014 27/00 |
| [50] | Field of Search | 324/57 R,<br>57 DE, 57 FP, 57 PI |

[56] References Cited
UNITED STATES PATENTS

| 2,143,094 | 1/1939 | Swift | 324/57 DE |
| 2,626,306 | 1/1953 | Eicher et al | 324/57 DE |

*Primary Examiner*—Eli Lieberman
*Attorney*—Raymond J. McElhannon

ABSTRACT: A test signal is produced by adding a sinusoidal signal at a fundamental frequency to the second harmonic thereof which has been produced by squaring the fundamental frequency signal in a linear multiplier and eliminating the DC component. The dual-frequency phase coherent test signal is detected after transmission through the transmission channel under test. The detected signal is acted upon with the low-frequency component being squared in a linear multiplier to produce an intermediate signal from which the DC component is eliminated and which is then combined with the high-frequency component in the detected signal by modulation with the aid of a further linear multiplier to produce the sum and difference components, the difference components being selected by a low-pass filter and measured as to peak-to-peak amplitude.

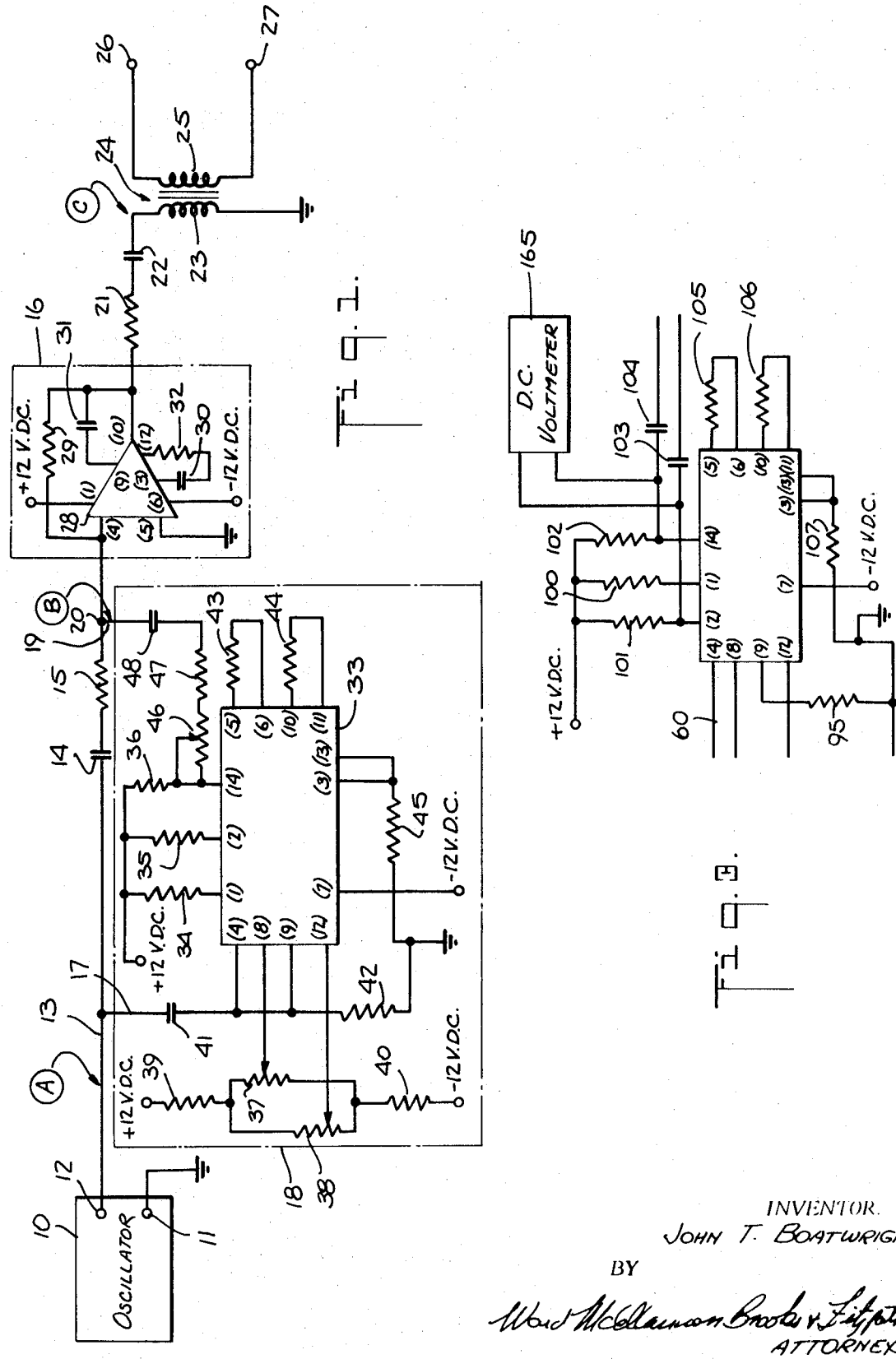

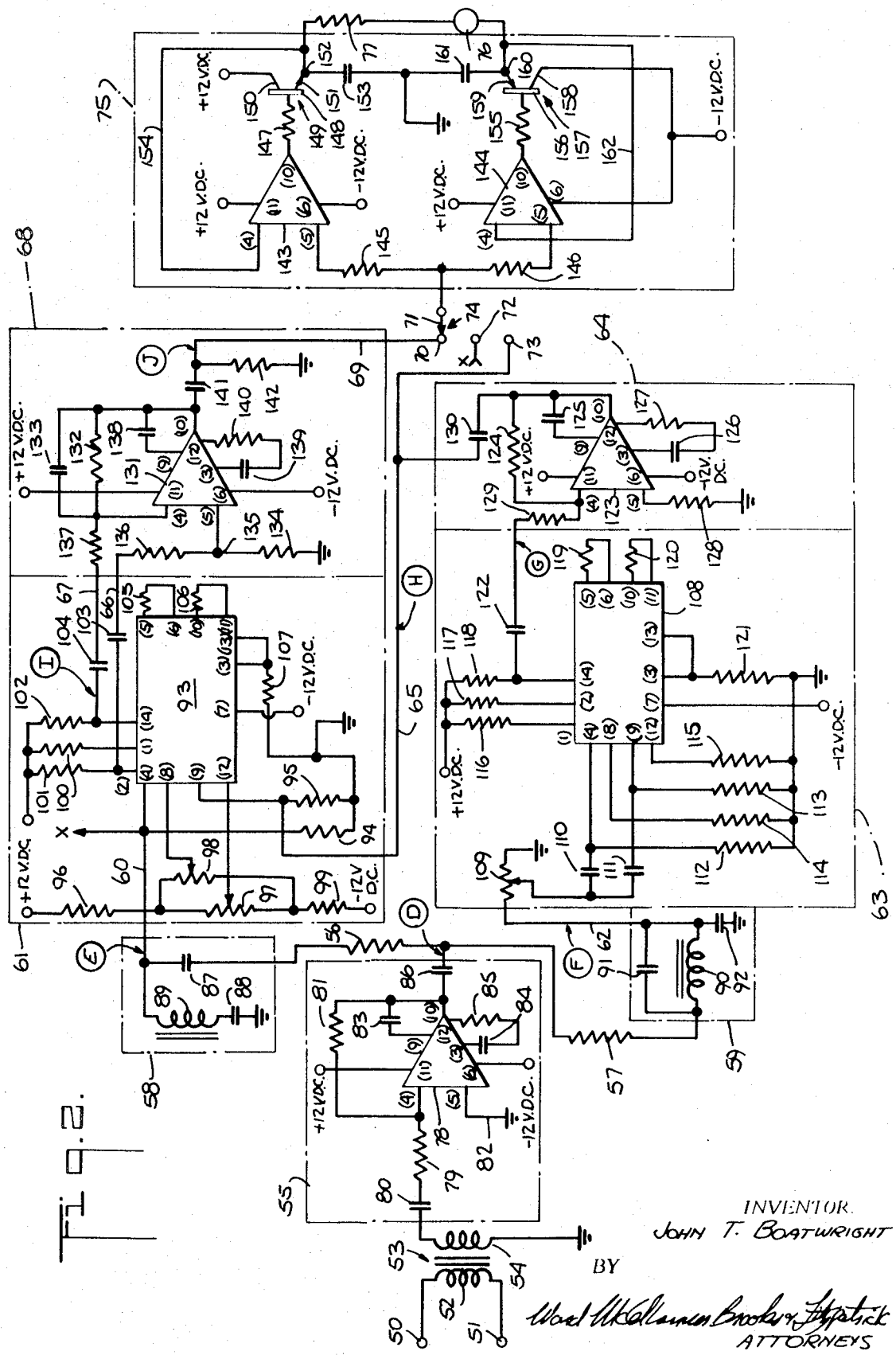

3,623,141

APPARATUS AND METHOD FOR MEASURING TRANSMISSION CHANNEL CHARACTERISTICS

The present invention relates to the method and apparatus for measuring certain characteristics of a signal transmission channel which affect signals passing through the channel from an input point to an output point within the frequency pass band thereof. More particularly, the invention is directed to the measurement of channel characteristics such as delay and the exponential modulation imposed by the channel in the form of phase or frequency modulation.

Previous techniques for measuring the aforesaid characteristics have required the use of separate reference signals in addition to the test signal which are conveyed either over the channel under test or via a parallel channel. The requirement for a reference signal unduly complicates the test equipment.

Therefore, it is an object of the present invention to provide a simple and reliable arrangement for performing the requisite tests without the use of a distinct separate reference signal source or auxiliary reference signal channel. The invention relies upon the production of two phase coherent signals as the test signal and on operation upon the signals as received at the receiving end such as to perform the desired measurement.

In accordance with one aspect of the invention, there is provided apparatus for performing the aforesaid measurement, the apparatus comprising in combination: means for producing a test signal including a first component at a fundamental frequency and a second component at a frequency equal to a predetermined multiple of the fundamental frequency, the two components being produced with phase coherency, means for coupling the test signal to an input point of the transmission channel, a detecting circuit, and means for coupling an input of the detecting circuit to an output point of the transmission channel, the detecting circuit including a frequency-multiplier stage having an input coupled to the detecting circuit input and responsive to at least those signals received at the detecting circuit input which have a frequency of the order of the fundamental frequency for producing an intermediate signal therefrom multiplied in frequency by the predetermined multiple and in phase coherency therewith, a modulator stage having a first and second input and an output, means coupling the detecting circuit input to the first modulator input, means for coupling the intermediate signal from the frequency-multiplier stage to the second modulator input, and means coupled to the modulator output for measuring a parameter of the modulator stage output signal.

In accordance with a further aspect of the invention, there is provided a method for measuring the desired characteristics of a signal transmission channel which comprises the steps of producing a test signal composed of a first and second signal component which are related with the second signal component having a frequency which is a given multiple of that of the first signal component and phase coherent therewith, applying the test signal to the channel at the input point, removing from the channel at the output point a modified signal resulting from passage of the test signal through the channel between the input and output points, multiplying the frequency of that portion of the modified signal which corresponds to the first signal component to provide an intermediate signal, modulating the intermediate signal with that portion of the modified signal which corresponds to the second signal component, and measuring a parameter of at least a portion of the modulation products.

The invention will be better understood after reading the following detailed description of the presently preferred embodiments thereof with reference to the appended drawings, in which:

FIG. 1 is a schematic circuit diagram showing the equipment for producing the test signal and applying it to the transmission channel;

FIG. 2 is a schematic circuit diagram showing the detecting circuit for receiving the transmitted test signal at the output point of the transmission channel and performing a phase jitter measurement thereof; and FIG. 3 is a fragmentary schematic circuit diagram showing a modification of the circuit of FIG. 2 for measuring the fixed time delay or phase shift introduced by the transmission channel.

Throughout the figures of the drawings, the same reference numerals are used to designate the same or similar parts.

Referring now to FIG. 1, an oscillator 10, which may be an externally connected independent unit, has one output terminal 11 connected to ground and another output terminal 12 connected over a conductor 13 through a capacitor 14 in series with a resistor 15 to an input of a summing amplifier 16. The output lead 13 from terminal 12 of the oscillator 10 is also connected through a lead 17 to an input of a frequency multiplier 18 whose output is connected over lead 19 to the junction 20 between the resistor 15 and the input of the summing amplifier 16. The output of the summing amplifier is connected through a resistor 21 in series with a capacitor 22 to the primary winding 23 of a line coupling transformer 24. The other side of the primary winding 23 is connected to ground as shown. The transformer 24 is also provided with a secondary winding 25 connected to output terminals 26 and 27 for connection to the input point of the transmission channel under test.

The summing amplifier 16 includes a Type 709 operational amplifier 28 having its noninverting input terminal connected to ground and its inverting input terminal connected to the junction point 20. The output of the amplifier 28 is connected through a feedback resistor 29 to the inverting input. Capacitors 30 and 31 with resistor 32, connected as shown, provide the necessary input and output frequency compensation.

The frequency multiplier 18 employs a linear four-quadrant multiplier integrated circuit 33 which, in this example, is either a type MC1495 or MC1595 manufactured by Motorola Semiconductor Products, Inc. This being a commercially available product it is not believed necessary to describe further the details of the multiplier which are readily available from the manufacturer. The various output connections or pin terminals are identified by the numbers within parentheses on the drawing. In this particular example a positive 12-volt DC supply is connected through resistors 34, 35 and 36, respectively, to pins (1), (2), and (14). Pins (8) and (12) are connected, as shown, to the sliders on potentiometers 37 and 38, respectively, which, in turn, are connected in parallel and in series with resistors 39 and 40 between the positive and negative 12-volt DC supply terminals.

The network consisting of resistors 37, 38, 39 and 40 constitutes an input offset adjustment circuit. The noninverting input terminals represented by pins (4) and (9) of the multiplier 33 are connected together and through the coupling capacitor 41 to the input lead 17. In addition, the pins (4) and (9) are connected to ground through a resistor 42. Resistors 43, 44 and 45, connected, as shown, to the various pins (5), (6), (10), (11), (3), and (13) determine the scaling factor K. The inverting output terminal (14) of the multiplier 33 is connected through an adjustable resistor 46 in series with a fixed resistor 47 and a capacitor 48 to the lead 19.

Before considering the operation of the circuit of FIG. 1, consideration will be given to the construction of the detecting circuit shown in FIG. 2 to which attention is now directed. The detecting circuit is provided with input terminals 50 and 51 connected to the primary winding 52 of a line transformer 53 whose secondary winding 54 is connected between ground and the input to a buffer amplifier 55. The output of the buffer amplifier 55 is connected in parallel through resistors 56 and 57 to the inputs of a high pass filter 58 and low pass filter 59, respectively. The output of the high pass filter 58 is connected over a lead 60 to one input of a balanced modulator circuit 61. The output of low pass filter 59 is connected through lead 62 to an input of a frequency-multiplier circuit 63 whose output is connected through a buffer amplifier circuit 64 to a lead 65 connected to a second input of the balanced modulator 61. Leads 66 and 67 connect the two outputs of the balanced modulator to an active low pass filter circuit 68 whose output is connected over a lead 69 to one fixed contact 70 of selector switch 71. As shown in the drawing, a second fixed contact 72 of the switch 71 is connected to the input of the balanced modulator 61 supplied over the lead 60. A third fixed contact 73 of the switch 71 is connected to the lead 65 carrying the output from the buffer amplifier 64. Switch 71 is provided with a movable contact 74 which is connected to the input of a peak-to-peak detector circuit 75 whose output is connected to a meter 76 in series with a resistor 77.

Considering the circuit of FIG. 2 in further detail, the buffer amplifier 55 consists of a Type 709 operational amplifier 78 having its inverting input connected through a resistor 79 and a capacitor 80 to the secondary winding 54 of the line transformer 53. The resistor 81 is connected to provide the usual feedback between the output of the amplifier and its input. The noninverting input of the amplifier is connected to ground over lead 82. Capacitors 83 and 84 with resistor 85 provide the necessary input and output frequency compensation. Finally, the output from the amplifier is derived through a coupling capacitor 86. The circuit constants are chosen for unity gain.

High pass filter 58 comprises the capacitors 87 and 88 connected to the inductor 89, as shown, while low pass filter 59 is formed by the inductor 90 and capacitors 91 and 92 connected as shown.

The balanced modulator circuit 61 makes use of another linear four-quadrant multiplier integrated circuit 93 of either Type MC1495 or MC1595 with pin terminals as shown. The input lead 60 is connected to the noninverting input terminal (4) and through resistor 94 to ground. The lead 65 from the buffer amplifier 64 is connected to the noninverting input terminal (9) and through resistor 95 to ground. Zero-offset adjustment is provided by fixed resistor 96, potentiometers 97 and 98 and fixed resistor 99 connected as shown to the plus 12-volt and minus 12-volt DC supply. The slider of potentiometer 97 is connected to pin (12) while the slider of potentiometer 98 is connected to pin (8) of the multiplier circuit 93. Pins (1), (2) and (14) of the multiplier 93 are connected, respectively, through resistors 100, 101 and 102 to the positive 12-volt DC supply. In addition, pin (2) is connected through a coupling capacitor 103 to output lead 66, while pin (14) is connected through coupling capacitor 104 to output lead 67. The scale factor is determined by resistors 105, 106 and 107 connected as shown to pins (5), (6), (10), (11), (3), and (13).

The frequency-multiplier circuit 63 also consists of a linear multiplier 108 of the same type as the multipliers 33 and 93, previously described. The lead 62 feeding the input of the multiplier circuit 63 is connected through the resistance element of a potentiometer 109 to ground. The slider of the potentiometer 109 is connected through a coupling capacitor 110 to the input pin (4) and through the coupling capacitor 111 to the input pin (9). Pins (4) and (9) are connected, respectively, through resistors 112 and 113 to ground. Similarly, pins (8) and (12) are connected, respectively, through resistors 114 and 115 to ground. The plus 12-volt DC supply is connected to pins (1), (2), and (14), respectively, through resistors 116, 117 and 118. The scale factor is determined by resistors 119, 120 and 121 connected to pins (5), (6), (10), (11), (3) and (13), as shown. The output from the multiplier circuit 63 is derived from pin (14) through coupling capacitor 122.

The buffer amplifier 64 includes another Type 709 operational amplifier 123 having a feedback resistor 124 and frequency compensation capacitors 125 and 126 along with resistor 127 connected, as shown. The noninverting input of the amplifier 123 is connected to ground through resistor 128 while the inverting input is connected through resistor 129 to the capacitor 122 at the output of the frequency multiplier 63. The output from the operational amplifier is coupled through a capacitor 130 to both the lead 65 and the switch contact 73.

Low pass filter 68 also includes a Type 709 operational amplifier 131 provided with a feedback network consisting of the resistor 132 in parallel with the capacitor 133. The noninverting input of the amplifier 131 is connected to ground through a resistor 134. The junction 135 between the resistor 134 and the noninverting input of the operational amplifier 131 is connected through another resistor 136 to the output lead 66 of the balanced modulator 61. The inverting input of the operational amplifier 131 is connected through a resistor 137 to the output lead 67 of the balanced modulator 61. The necessary frequency compensation for amplifier 131 is provided by the capacitors 138 and 139 cooperating with resistor 140 connected as shown. The output terminal of the operational amplifier 131 is connected through a coupling capacitor 141 to the output lead 69 which, in turn, is connected to ground through the resistor 142.

The peak-to-peak detector 75 has two Type 709 operational amplifiers 143 and 144. The noninverting inputs of amplifiers 143 and 144 are connected, respectively, through resistors 145 and 146 to the peak-to-peak detector input. The output of amplifier 143 is connected through a resistor 147 to the base electrode 148 of an NPN transistor 149. The positive 12-volt DC supply is connected to a collector electrode 150 of transistor 149 while the emitter electrode 151 is connected to a junction point 152. Junction 152 is first connected through a capacitor 153 to ground and is also connected over a feedback lead 154 to the inverting input of amplifier 143. In addition, point 152 is connected to one end of resistor 77. This represents one output point of the peak-to-peak detector.

In somewhat similar fashion, the output of amplifier 144 is connected through a resistor 155 to the base electrode 156 of a PNP transistor 157 whose collector electrode 158 is connected to the minus 12-volt DC supply. The emitter electrode 159 of transistor 157 is connected to a junction point 160 which, in turn, is connected through a capacitor 161 to ground. Point 160 is also connected to the inverting input of amplifier 144 by a feedback lead 162. Finally, point 160 is connected to the negative terminal of the DC meter 76. This represents the second output from the peak-to-peak detector.

The operation of the circuit of FIG. 1 will now be described. Oscillator 10, when coupled to the test signal generator, provides a sinusoidal signal on lead 13 represented by equation (A) set out below:

$$E_A = E\sin\omega_o t \quad (A)$$

The sinusoidal signal is fed through lead 17 and capacitor 41 in parallel to the two inputs of the multiplier 33. It will be understood that the output of the multiplier 33 acting as a squaring circuit will contain a DC component plus a second harmonic component of the fundamental frequency supplied to its input. Since capacitor 48 serves to eliminate the DC component, the signal at the output on lead 19 may be represented by equation (B) below, while equation (C) represents the signal as supplied to the line transformer 24 bearing in mind that amplifier stage 16 acts as a summing amplifier.

$$E_B = (K_1 E)/(2) \cos 2\omega_o t \quad (B)$$
$$E_C = -E\sin\omega_o t (-E)/(2) \cos 2\omega_o t \quad (C)$$

In equation (B) the term $K_1$ represents the scale factor of the multiplier 33 which is generally of the order of one-tenth. Therefore, by relating resistors 15 and 47 in the ratio of 10 to 1, the effect of the scale factor of the frequency multiplier 18 is balanced out and the $K_1$ term disappears from equation (C).

In essence, the signal applied to the terminals 26 and 27 at the output of the circuit of FIG. 1 may be viewed as a two-tone test signal. This signal experiences attenuation, delay, and exponential modulation as it passes through the transmission channel to the input terminals 50 and 51 of the receiving section or detecting circuit shown in FIG. 2 to which attention is now directed. The modified signal received at the input of the detecting circuit is merely inverted in phase as it passes through the buffer amplifier stage 55. It may be represented by equation (D) below where the terms $A_1$ and $B_1$ represent frequency dependent attenuation constants, $\Phi_1$ and $\Phi_2$ represent fixed phase shifts due to the channel delay, and $k_p(t)$ represents the time dependent phase modulation component.

$$E_D = A_1 E \sin[\omega_o t + \Phi_1 + k_p(t)] + (B_1 E)/(2) \cos[2\omega_o t + \Phi_2 + k_p(t)]$$
$$(D)$$

The filters 58 and 59 separate the incoming signal, with the high pass filter 58 supplying to the lead 60 a signal as represented by equation (E) having a frequency at least as high as the second harmonic of the basic fundamental frequency of oscillator 10. The low pass filter 59 passes to the multiplier 63 that component which has a frequency below the second harmonic of the aforesaid fundamental frequency and is represented by equation (F). It will be seen that the signals represented by equations (E) and (F) have frequencies, respectively, of the order of the frequencies of the signals represented by equations (B) and (A).

$$E_E = (B_1 E)/2 \cos [2\omega t + \Phi_2 + k_p(t)] \quad (E)$$

$$E_F = A_1 E \sin [\omega t + \Phi_1 + k_p(t)] \quad (F)$$

The frequency-multiplier 63 functions in very much the same manner as the frequency-multiplier 18 in the circuit of FIG. 1. Therefore, bearing in mind that the coupling capacitor 122 eliminates the DC component from the output of the squaring circuit portion, the intermediate signal supplied to the buffer amplifier 64 may be represented by the following equation (G) wherein the term $K_2$ represents the scale factor of the frequency-multiplier stage which, as previously mentioned, is normally about one-tenth.

$$E_G = (K_2 A_1 E)/(2) \cos [2\omega_0 t + 2\Phi_1 + 2k_p(t)] \quad (G)$$

As mentioned, the signal applied to stage 63 has a frequency of the same order as that provided by oscillator 10. It should be noted in addition that the output of stage 63 is multiplied in frequency by the same multiple that the oscillator signal was multiplied by multiplier 18. In the present example the multiple for both multipliers is two, but any multiple may theoretically be used so long as it is the same for both multipliers. It is also important that the signal produced by the multiplier when functioning as a squaring circuit be phase coherent with the signal applied to its inputs.

In well-known manner, as evident from the value of the circuit constants set out hereinafter, the buffer amplifier 64 amplifies the signal in order to eliminate the effect of the scaling factor of the preceding stage. Thus, the signal on lead 65 may be represented by equation (H) allowing for the phase inversion of the amplifier 64.

$$E_H = (-A_1 E)/2 \cos [2\omega t + 2\Phi_1 + 2k_p(t)] \quad (H)$$

The signals represented by equations (E) and (H) are multiplied in the balanced modulator circuit 61 producing the sum and difference components reflected in its output as set forth in the following equation (I), the scale factor of multiplier 93 being ignored:

$$E_I = \frac{A_1 B_1 E^2}{4} \cos [4\omega_0 t + 2\phi_1 + \phi_2 + 3k_p(t)]$$

$$+ \frac{A_1 B_1 E^2}{4} \cos [2\phi_1 - \phi_2 + k_p(t)] \quad (I)$$

The operation of the low pass filter circuit 68 should be well known. The signal at its output on lead 69 may be represented by equation (J) bearing in mind that the capacitors 103 and 104 in the output of the balanced modulator stage 61 eliminate the DC components.

$$E_J = -(A_1 B_1 E^2)/(4) \cos k_p(t) \quad (J)$$

With the switch 71 in the position shown in the drawing the signal represented by equation (J) has its peak-to-peak amplitude measured by the circuit 75 whose operation should be well known. The reading on meter 76 will, therefore, provide an indication of the amount of phase modulation or phase jitter introduced by the transmission channel.

If it is desired to measure the fixed delay or fixed phase shift introduced by the transmission channel, resort may be had to the modification shown in FIG. 3. As seen therein a DC voltmeter 165 has its terminals connected directly to the pins (2) and (14) of the multiplier circuit 93 in the balanced modulator stage 61. The remainder of the circuit may be identical to that shown in FIG. 2, or the capacitors 103 and 104 may be eliminated along with all of the equipment to which their output is connected in the circuit of FIG. 2.

For calibration purposes switch 71 in FIG. 2 may be manipulated to contact 72 or 73 to measure the signals present at each of the two inputs to the balanced modulator stage 61.

Without intending to be limited thereby, the following circuit constants which have been found satisfactory are set forth for the embodiment described above. The various components are identified by the reference numerals used in the drawings. The following abbreviations are used: $K = \times 10^3$; pf = picofarad. All capacitances are in microfarad unless otherwise indicated.

RESISTORS

| Ref. No. | OHMS | Ref. No. | OHMS | Ref. No. | OHMS |
|---|---|---|---|---|---|
| 15 | 100K | 79 | 100K | 116 | 3K |
| 21 | 464 | 81 | 100K | 117 | 3.3K |
| 29 | 51K | 85 | 1500 | 118 | 3.3K |
| 32 | 1500 | 94 | 10K | 119 | 8.2K |
| 34 | 3K | 95 | 10K | 120 | 8.2K |
| 35 | 3.3K | 96 | 10K | 121 | 6.8K |
| 36 | 3.3K | 97 | 10K | 124 | 100K |
| 37 | 10K | 98 | 10K | 127 | 1500 |
| 38 | 10K | 99 | 10K | 128 | 10K |
| 39 | 10K | 100 | 3K | 129 | 10K |
| 40 | 10K | 101 | 3.3K | 132 | 220K |
| 42 | 10K | 102 | 3.3K | 134 | 220K |
| 43 | 8.2K | 105 | 8.2K | 136 | 22K |
| 44 | 8.2K | 106 | 8.2K | 137 | 22K |
| 45 | 6.8K | 107 | 6.8K | 140 | 1500 |
| 46 | 20K | 109 | 1K | 142 | 100K |
| 47 | 10K | 112 | 10K | 145 | 10K |
| 56 | 1K | 113 | 10K | 146 | 10K |
| 57 | 1K | 114 | 10K | 147 | 1K |
| 77 | 30K | 115 | 10K | 155 | 1K |

CAPACITORS

| Ref. No. | Capacitance | Ref. No. | Capacitance | Ref. No. | Capacitance |
|---|---|---|---|---|---|
| 14 | 0.47 | 87 | [See Note] | 125 | 22pf. |
| 22 | 22 | 88 | [See Note] | 126 | 510pf. |
| 30 | 0.005 | 91 | [See Note] | 130 | 0.47 |
| 31 | 220 | 92 | [See Note] | 133 | 0.1 |
| 41 | 0.1 | 103 | 0.1 | 138 | 22pf. |
| 48 | 0.47 | 104 | 0.1 | 139 | 1,000pf. |
| 80 | 0.1 | 110 | 0.1 | 141 | 0.47 |
| 83 | 22pf. | 111 | 0.1 | 153 | 10 |
| 84 | 510pf. | 122 | 0.47 | 161 | 10 |
| 86 | 0.47 | | | | |

NOTE: Capacitors 87 and 88 are chosen with choke 89 to provide filter 58 with a cutoff frequency just below $2\omega_0$ and with a zero at $\omega_0$. Characteristic input and output impedance equal 1,000 ohms.

Capacitors 91 and 92 are chosen with choke 90 to provide filter 59 with a cutoff frequency just above $\omega_0$ and with a zero at $2\omega_0$. Characteristic input and output impedance equal 1,000 ohms.

Linear Multipliers 33, 93, 108—Type MC 1495 (Motorola Semiconductor Products Inc.)
Operational amplifiers 28, 78, 123, 131, 143, 144—Type 709
Transistors 149, 157—2N3903 and 2N3905, respectively.
Meter 76—0–100 $\mu$A full scale—linear scale.

Having described the invention with reference to the presently preferred embodiments thereof, it will be appreciated by those skilled in the art that various changes may be made in the construction thereof without departing from the basic conception of the invention and its true spirit as defined in the appended claims.

What is claimed is:

1. Apparatus for measuring characteristics of a signal transmission channel affecting signals passing through the channel from an input point to an output point within the frequency pass band thereof, said apparatus comprising in combination: means for producing a test signal including a first component at a fundamental frequency and a second component at a frequency equal to a predetermined multiple of said fundamental frequency, said two components being produced with phase coherency, means for coupling said test signal to an input point of the transmission channel, a detecting circuit, and means for coupling an input of said detecting circuit to an output point of the transmission channel, said detecting circuit including a frequency-multiplier stage having an input coupled to said detecting circuit input and responsive to at least those signals received at said detecting circuit input which have a frequency of the order of said fundamental frequency for producing an intermediate signal therefrom multiplied in frequency by said predetermined multiple and in phase coherency therewith, a modulator stage having a first and a second input and an output, means coupling said detecting circuit input to said first modulator input, means for coupling said intermediate signal from said frequency-multiplier stage to said second modulator input, and means coupled to said modulator output for measuring a parameter of the modulator stage output signal.

2. Apparatus according to claim 1, wherein said predetermined multiple is equal to 2.

3. Apparatus according to claim 2, wherein said frequency-multiplier stage comprises a linear multiplier circuit having means coupled to its output for removing the DC components therefrom, and said input of the frequency multiplier includes the two inputs of the multiplier circuit connected in parallel.

4. Apparatus according to claim 2, wherein said modulator stage comprises a linear multiplier circuit for performing modulation through multiplication.

5. Apparatus according to claim 2, wherein a low pass filter is provided for coupling said frequency multiplier input to said detecting circuit input for passing to the frequency multiplier only those signals having a frequency below the second harmonic of said fundamental frequency, and the means coupling said detecting circuit input to said first modulator input comprises a high pass filter for passing only those signals having a frequency at least as high as the second harmonic of said fundamental frequency.

6. Apparatus according to claim 2, wherein said means coupled to said modulator output is constructed to measure a parameter of the difference frequency component of the modulator stage output signal.

7. Apparatus according to claim 2, wherein said means coupled to said modulator output is constructed to measure the magnitude of the DC component present in the modulator stage output signal.

8. Apparatus according to claim 3, wherein said modulator stage comprises a linear multiplier circuit for performing modulation through multiplication, and wherein a low pass filter is provided for coupling said frequency-multiplier input to said detecting circuit input for passing to the frequency multiplier only those signals having a frequency below the second harmonic of said fundamental frequency, and the means coupling said detecting circuit input to said first modulator input comprises a high pass filter for passing only those signals having a frequency at least as high as the second harmonic of said fundamental frequency.

9. Apparatus according to claim 8, wherein said means coupled to said modulator output comprises a peak detector measuring circuit having an input, and a low pass filter circuit having an output coupled to the peak detector input and having an input capacitively coupled to the modulator output, for measuring the AC content of the difference frequency component of the modulator stage output signal.

10. Apparatus according to claim 8, wherein said means coupled to said modulator output comprises a DC voltmeter directly coupled thereto.

11. The method of measuring characteristics of a signal transmission channel affecting signals passing through the channel from an input point to an output point within the frequency pass band thereof, which comprises the steps of producing a test signal composed of a first and second signal component which are related with said second signal component having a frequency which is a given multiple of that of said first signal component and phase coherent therewith, applying said test signal to said channel at said input point, removing from said channel at said output point a modified signal resulting from passage of said test signal through said channel between said input and output points, multiplying the frequency of that portion of said modified signal which corresponds to said first signal component to provide an intermediate signal, modulating said intermediate signal with that portion of said modified signal which corresponds to said second signal component, and measuring a parameter of at least a portion of the modulation products.

* * * * *